US008445672B2

(12) United States Patent
Hassan et al.

(10) Patent No.: US 8,445,672 B2
(45) Date of Patent: May 21, 2013

(54) HIGH SHEAR PROCESS FOR DEXTROSE PRODUCTION

(75) Inventors: Abbas Hassan, Sugar Land, TX (US); Ebrahim Bagherzadeh, Sugar Land, TX (US); Rayford G. Anthony, College Station, TX (US); Gregory Borsinger, Chatham, NJ (US); Aziz Hassan, Sugar Land, TX (US)

(73) Assignee: H R D Corporation, Houston, TX (US)

( * ) Notice: Subject to any disclaimer, the term of this patent is extended or adjusted under 35 U.S.C. 154(b) by 309 days.

(21) Appl. No.: 12/146,733

(22) Filed: Jun. 26, 2008

(65) Prior Publication Data

US 2009/0005553 A1    Jan. 1, 2009

Related U.S. Application Data

(60) Provisional application No. 60/946,608, filed on Jun. 27, 2007.

(51) Int. Cl.
*C07H 1/00* (2006.01)
*C08B 31/00* (2006.01)

(52) U.S. Cl.
USPC ............................... 536/124; 536/102

(58) Field of Classification Search
USPC ................................................ 536/102, 124
See application file for complete search history.

(56) References Cited

U.S. PATENT DOCUMENTS

| | | | |
|---|---|---|---|
| 2,305,168 A | 12/1942 | Langlois | |
| 2,531,999 A | 11/1950 | Wallerstein | |
| 2,717,852 A | 9/1955 | Stone | |
| 2,783,101 A | 2/1957 | Walker | |
| 2,891,869 A | 6/1959 | Langlois | |
| 2,893,921 A | 7/1959 | Langlois | |
| 3,012,944 A | 12/1961 | Armbruster | |
| 3,042,584 A | 7/1962 | Kooi et al. | |
| 3,519,538 A | 7/1970 | Messing et al. | |
| 3,619,371 A | 11/1971 | Crook et al. | |
| 3,627,638 A | 6/1972 | Krebs | |
| 3,672,955 A | 6/1972 | Stanley | |
| 3,715,277 A | 2/1973 | Dinelli | |
| 3,783,101 A | 1/1974 | Tomb et al. | |
| 3,853,706 A * | 12/1974 | Armbruster | 435/99 |
| 3,897,305 A | 7/1975 | Hurst | |
| 3,950,222 A | 4/1976 | Takasaki | |
| 3,986,890 A | 10/1976 | Richter et al. | |
| 4,102,745 A | 7/1978 | Thompson et al. | |
| 4,734,364 A | 3/1988 | Line et al. | |
| 4,761,185 A | 8/1988 | Chornet et al. | |
| 5,104,674 A | 4/1992 | Chen et al. | |
| 5,370,999 A | 12/1994 | Stuart | |
| 5,498,766 A * | 3/1996 | Stuart et al. | 435/99 |
| 5,538,191 A | 7/1996 | Holl | |
| 5,877,350 A | 3/1999 | Langer et al. | |
| 6,368,366 B1 | 4/2002 | Langer et al. | |
| 6,368,367 B1 | 4/2002 | Langer et al. | |
| 6,383,237 B1 | 5/2002 | Langer et al. | |
| 6,530,964 B2 | 3/2003 | Langer et al. | |
| 6,742,774 B2 | 6/2004 | Holl | |
| 7,479,576 B1 * | 1/2009 | Hassan et al. | 568/881 |
| 2002/0010249 A1 * | 1/2002 | Bilimoria | 524/447 |
| 2003/0043690 A1 | 3/2003 | Holl | |
| 2004/0052158 A1 | 3/2004 | Holl | |
| 2005/0033069 A1 | 2/2005 | Holl et al. | |
| 2006/0245991 A1 | 11/2006 | Holl | |
| 2007/0014905 A1 * | 1/2007 | Chen et al. | 426/490 |

FOREIGN PATENT DOCUMENTS

| | | |
|---|---|---|
| EP | 1008380 B1 | 3/2004 |
| WO | 9505087 A1 | 2/1995 |
| WO | 2002064708 A2 | 8/2002 |
| WO | 03015537 A1 | 2/2003 |
| WO | 2004007739 | 1/2004 |

OTHER PUBLICATIONS

Van Der Veena, et al., "Starch Hydrolysis Under Low Water Conditions: A Conceptual Process Design," Journal of Food Engineering, (Jul. 2006), vol. 75(2), pp. 178-186.
Van Den Einde, et al., "The Effect of Thermomechanical Treatment on Starch Breakdown and the Consequences for Process Design," Carbohydrate Polymers, (2004), vol. 55, pp. 57-63.
International Search Report, International Search Application No. PCT/US2008/068371, dated Dec. 30, 2008.
Gogate et al., "Cavitation: A technology on the horizon," Current Science 91 (No. 1): 35-46 (2006).
IKA-Rotor-Stator Generators - 2003 Processing Catalog; 38 pages.
Supplementary European Search Report dated May 9, 2012 for counterpart European Application 08772047.0; 7 pages.
Office Action dated Jun. 25, 2009 for U.S. Appl. No. 12/142,447.
Office Action dated Jan. 7, 2010 for U.S. Appl. No. 12/142,447.
Office Action dated May 13, 2010 for U.S. Appl. No. 12/142,447.
Office Action dated Feb. 4, 2010 for U.S. Appl. No. 12/492,721.
Office Action dated Feb. 18, 2010 for U.S. Appl. No. 12/635,433.
Office Action dated Feb. 18, 2010 for U.S. Appl. No. 12/635,454.
Office Action dated May 14, 2010 for U.S. Appl. No. 12/137,441.
Office Action dated Feb. 19, 2010 for U.S. Appl. No. 12/144,459.
Office Action dated Sep. 2, 2009 for U.S. Appl. No. 12/142,433.
Office Action dated Jan. 29, 2010 for U.S. Appl. No. 12/142,433.
Office Action dated May 24, 2010 for U.S. Appl. No. 12/142,433.
Office Action dated Apr. 30, 2010 for U.S. Appl. No. 12/141,191.

(Continued)

*Primary Examiner* — Patrick Lewis
*Assistant Examiner* — Everett White
(74) *Attorney, Agent, or Firm* — Porter Hedges LLP; Timothy S. Westby

(57) ABSTRACT

Use of a high shear mechanical device in a process for production of starch hydrolysate by reacting starch with a hydrolytic agent makes possible a decrease in mass transfer limitations, thereby enhancing production of starch hydrolysate. A system for production of starch hydrolysate is also provided in which a reactor is configured to receive the output from a high shear device, which is configured to receive a starch and lysing reagent. The high shear device is configured to generate a fine dispersion or emulsion of lysing.

20 Claims, 2 Drawing Sheets

OTHER PUBLICATIONS

Office Action dated Oct. 27, 2009 for U.S. Appl. No. 12/142,120.
Office Action dated May 5, 2010 for U.S. Appl. No. 12/571,537.
Office Action dated Feb. 24, 2011 for U.S. Appl. No. 12/796,358 (13 pgs.).
Office Action dated Feb. 29, 2012 for U.S. Appl. No. 12/146,733 (8 pgs.).
Office Action dated Jun. 3, 2011 for U.S. Appl. No. 12/568,155 (11 pgs.).
Office Action dated Jun. 2, 2011 for U.S. Appl. No. 12/427,286 (12 pgs.).
Office Action dated Jun. 3, 2011 for U.S. Appl. No. 12/568,280 (16 pgs.).

* cited by examiner

HIGH SHEAR PROCESS FOR DEXTROSE PRODUCTION

CROSS-REFERENCE TO RELATED APPLICATIONS

This application claims the benefit under 35 U.S.C. §119(e) of U.S. Provisional Patent Application No. 60/946,608 filed Jun. 27, 2007, the disclosure of which is hereby incorporated herein by reference.

STATEMENT REGARDING FEDERALLY SPONSORED RESEARCH OR DEVELOPMENT

Not Applicable.

BACKGROUND OF THE INVENTION

1. Technical Field

The present disclosure generally relates to the conversion of starch to simpler carbohydrates, and more particularly to apparatus and methods for converting starch to dextrose. More specifically, the disclosure relates to the reduction of mass transfer limitations for the hydrolysis of starch.

2. Background of the Invention

Starch can be hydrolyzed into simpler carbohydrates by acids, various enzymes, or a combination of the two. There are many food products synthesized by the hydrolysis of starch. The extent of conversion is typically quantified by dextrose equivalent (DE), which is roughly the fraction of the glycoside bonds in starch that have been broken. Maltodextrin is a lightly hydrolyzed (DE 10-20) starch product used as a bland-tasting filler and thickener. Viscous solutions of various corn syrups (DE 30-70) are used as sweeteners and thickeners in many kinds of processed foods. Dextrose (DE 100), or commercial glucose (D-glucose), is prepared by the complete hydrolysis of starch. High fructose syrup is obtained by treating dextrose solutions with the enzyme glucose isomerase, until a substantial fraction of the glucose has been converted to fructose.

In the United States, dextrose and high fructose corn syrup are particularly important commercial food products. Dextrose is a white odorless tasteless granular or powdery complex carbohydrate having the chemical formula $(C_6H_{10}O_5)_x$. Dextrose is the chief form of carbohydrate storage in plants and has additional applications in adhesives, laundering, pharmaceuticals, and medicine. High fructose corn syrup is the principal sweetener used in sweetened beverages to lower the cost of production. A lower quantity of the high fructose corn syrup can be used in recipes compared to glucose because fructose tastes sweeter than glucose.

Historically, the starch wet-milling industry produced all starch-derived syrups by acid hydrolysis. There are several disadvantages of the acid process that were corrected by replacing the acid process with a two-step process as disclosed in U.S. Pat. No. 2,891,869. In the disclosure, the first step comprises solubilizing or liquefying refined raw starch to create a low DE syrup product. Liquefication is accomplished by limited hydrolysis at high temperature using either acid or thermostable endoamylases, such as those produced by *Bacillus lichenformis*. The second step comprises subjecting the low DE syrups produced in the first step to more extensive hydrolysis reactions. The second step may also be known as saccharification. The second step produces syrups consisting of low molecular weight sweet sugars using enzymes that are very specific with regard to the products they form. The overall procedure is thus referred to as an acid-enzyme or a double enzyme process depending on the mode of liquefaction.

The process of breaking a complex carbohydrate, such as starch or cellulose, into its monosaccharide components is also referred to as saccharification. U.S. Pat. No. 2,891,869 discloses the preparation of cornstarch derived syrups using the acid-enzyme process. In the disclosure, syrups of varying composition were prepared by altering the saccharifying enzymes utilized. The patent discloses that fungal glucoamylase (GA) produces glucose as the sole product and that malt diastase produces the disaccharide maltose as a major product. Syrups containing various proportions of these two sugars may be prepared by saccharifying the substrate with a combination of glucoamylase and malt diastase. Subsequent investigations have been concerned with the development of enzyme systems that increase the degree of starch saccharification and thereby the yields of these products.

A number of procedures covering immobilized enzyme technology for continuous dextrose production from starch have been described. In the disclosures regarding enzyme immobilization, immobilization of the enzyme glucoamylase has been the focus. Many methods of glucoamylase immobilization are available, for example, the methods described in U.S. Pat. Nos. 2,717,852; 3,519,538; 3,619,371; 3,627,638; 3,672,955; 3,715,277; 2,783,101; and 3,950,222.

Accordingly, there is a need in the industry for improved methods of producing dextrose and other starch hydrolysates from starch, whereby production rates are increased, improved reactant mixing, and lower reactant requirements are commercially feasible.

SUMMARY OF THE INVENTION

A high shear system and process for accelerating production of high DE syrups from starch is disclosed. The high shear process makes possible a reduction in mass transfer limitations, thereby increasing the reaction rate and enabling a reduction in contact time, an increase in product yield and/or a reduction in enzyme/lysing agent usage. In accordance with certain embodiments of the present invention, a process is provided that makes possible an increase in the rate of a process for the production of low DE syrups from starch by providing for more optimal contact of reactants than previously feasible. The process employs an external high shear mechanical device to provide mixing which accelerates reactant interaction.

These and other embodiments, features, and advantages will be apparent in the following detailed description and drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

Overview

Figure 1:
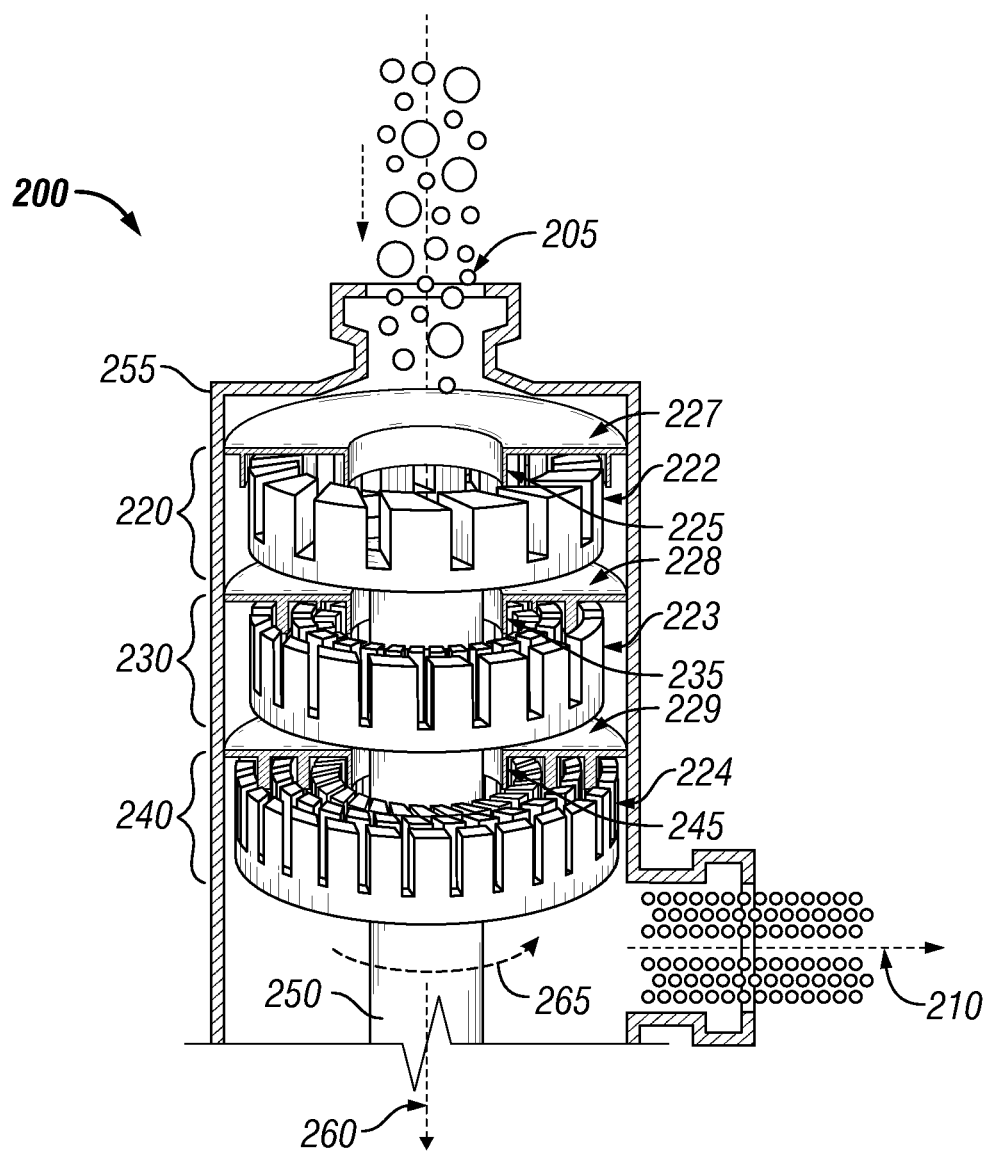
FIG. 1 is a cross-sectional diagram of a high shear device for the production of starch hydrolysate.

The present disclosure provides a system and method for the hydrolysis of starch comprising mixing carbohydrates and enzymes with a high shear device. The system and method employ a high shear mechanical device to provide rapid contact and mixing of reactants in a controlled environment in the reactor/mixer device. The high shear device reduces the mass transfer limitations on the reaction and thus increases the overall reaction rate.

Chemical reactions involving liquids, gases, and solids rely on the laws of kinetics that involve time, temperature, and pressure to define the rate of reactions. Where it is desirable to react two or more raw materials of different phases (e.g. solid and liquid; liquid and gas; solid, liquid and gas), one of the limiting factors controlling the rate of reaction is the contact time of the reactants. In the case of heterogeneously enzyme-catalyzed reactions, there may be an additional rate limiting factor, namely, removing the reaction products from the surface of the enzyme to enable the enzyme to catalyze further reactants.

In conventional reactors, contact time for the reactants and/or enzyme is often controlled by mixing which provides contact between two or more reactants involved in a chemical reaction. A reactor assembly that comprises a high shear device makes possible decreased mass transfer limitations and thereby allows the reaction to more closely approach kinetic limitations. When reaction rates are accelerated, residence times may be decreased, thereby increasing obtainable throughput.

High Shear Device

High shear devices (HSD) such as high shear mixers and high shear mills, are generally divided into classes based upon their ability to mix fluids. Mixing is the process of reducing the size of inhomogeneous species or particles within the fluid. One metric for the degree or thoroughness of mixing is the energy density per unit volume that the mixing device generates to disrupt the fluid. The classes are distinguished based on delivered energy density. There are three classes of industrial mixers having sufficient energy density to produce mixtures or emulsions with particle or bubble sizes in the range of 0 to 50 µm consistently.

Homogenization valve systems are typically classified as high-energy devices. Fluid to be processed is pumped under very high pressure through a narrow-gap valve into a lower pressure environment. The pressure gradients across the valve and the resulting turbulence and cavitations act to break-up any particles in the fluid. These valve systems are most commonly used in milk homogenization and may yield average particle size range from about 0.01 µm to about 1 µm. At the other end of the spectrum are high shear mixer systems classified as low energy devices. These systems usually have paddles or fluid rotors that turn at high speed in a reservoir of fluid to be processed, which in many of the more common applications is a food product. These systems are usually used when average particle, globule, or bubble, sizes of greater than 20 microns are acceptable in the processed fluid.

Between low energy-high shear mixers and homogenization valve systems, in terms of the mixing energy density delivered to the fluid, are colloid mills, which are classified as intermediate energy devices. The typical colloid mill configuration includes a conical or disk rotor that is separated from a complementary, liquid-cooled stator by a closely controlled rotor-stator gap, which may be in the range from about 0.025 mm to 10.0 mm. Rotors may preferably be driven by an electric motor through a direct drive or belt mechanism. Many colloid mills, with proper adjustment, may achieve average particle, or bubble, sizes of about 0.01 µm to about 25 µm in the processed fluid. These capabilities render colloid mills appropriate for a variety of applications including colloid and oil/water-based emulsion processing such as preparation of cosmetics, mayonnaise, silicone/silver amalgam, and roofing-tar mixtures.

Referring now to FIG. 1, there is presented a schematic diagram of a high shear device 200. High shear device 200 comprises at least one rotor-stator combination. The rotor-stator combinations may also be known as generators 220, 230, 240 or stages without limitation. The high shear device 200 comprises at least two generators, and most preferably, the high shear device comprises at least three generators.

The first generator 220 comprises rotor 222 and stator 227. The second generator 230 comprises rotor 223, and stator 228; the third generator comprises rotor 224 and stator 229. For each generator 220, 230, 240 the rotor is rotatably driven by input 250. The generators 220, 230, 240 are configured t0 rotate about axis 260, in rotational direction 265. Stator 227 is fixably coupled to the high shear device wall 255.

The generators include gaps between the rotor and the stator. The first generator 220 comprises a first gap 225; the second generator 230 comprises a second gap 235; and the third generator 240 comprises a third gap 245. The gaps 225, 235, 245 are between about 0.025 mm (0.01 in) and 10.0 mm (0.4 in) wide. Alternatively, the process comprises utilization of a high shear device 200 wherein the gaps 225, 235, 245 are between about 0.5 mm (0.02 in) and about 2.5 mm (0.1 in). In certain instances, the gap is maintained at about 1.5 mm (0.06 in). Alternatively, the gaps 225, 235, 245 are different between generators 220, 230, 240. In certain instances, the gap 225 for the first generator 220 is greater than about the gap 235 for the second generator 230, which is greater than about the gap 245 for the third generator 240.

Additionally, the width of the gaps 225, 235, 245 may comprise a coarse, medium, fine, and super-fine characterization. Rotors 222, 223, and 224 and stators 227, 228, and 229 may be toothed designs. Each generator may comprise two or more sets of rotor-stator teeth, as known in the art. Rotors 222, 223, and 224 may comprise a number of rotor teeth circumferentially spaced about the circumference of each rotor. Stators 227, 228, and 229 may comprise a number of stator teeth circumferentially spaced about the circumference of each stator. In embodiments, the inner diameter of the rotor is about 11.8 cm. In embodiments, the outer diameter of the stator is about 15.4 cm. In further embodiments, the rotor and stator may have an outer diameter of about 60 mm for the rotor, and about 64 mm for the stator. Alternatively, the rotor and stator may have alternate diameters in order to alter the tip speed and shear pressures. In certain embodiments, each of three stages is operated with a super-fine generator, comprising a gap of between about 0.025 mm and about 3 mm. When a feed stream 205 including solid particles is to be sent through high shear device 200, the appropriate gap width is first selected for an appropriate reduction in particle size and increase in particle surface area. In embodiments, this is beneficial for increasing catalyst surface area by shearing and dispersing the particles.

High shear device 200 is fed a reaction mixture comprising the feed stream 205. Feed stream 205 comprises an emulsion of the dispersible phase and the continuous phase. Emulsion refers to a liquefied mixture that contains two distinguishable substances (or phases) that will not readily mix and dissolve together. Most emulsions have a continuous phase (or matrix), which holds therein discontinuous droplets, bubbles, and/or particles of the other phase or substance. Emulsions may be highly viscous, such as slurries or pastes, or may be foams, with tiny gas bubbles suspended in a liquid. As used herein, the term "emulsion" encompasses continuous phases comprising gas bubbles, continuous phases comprising particles (e.g., solid catalyst), continuous phases comprising droplets, or globules, of a fluid that is insoluble in the continuous phase, and combinations thereof.

Feed stream 205 may include a particulate solid catalyst component. Feed stream 205 is pumped through the generators 220, 230, 240, such that product dispersion 210 is formed. In each generator, the rotors 222, 223, 224 rotate at high speed relative to the fixed stators 227, 228, 229. The rotation of the rotors pumps fluid, such as the feed stream 205, between the outer surface of the rotor 222 and the inner surface of the stator 227 creating a localized high shear condition. The gaps 225, 235, 245 generate high shear forces that process the feed stream 205. The high shear forces between the rotor and stator functions to process the feed stream 205 to create the product dispersion 210. Each generator 220, 230, 240 of the high shear device 200 has interchangeable rotor-stator combinations for producing a narrow distribution of the desired bubble size, if feedstream 205 comprises a gas, or globule size, if feedstream 205 comprises a liquid, in the product dispersion 210.

The product dispersion 210 of gas particles, globules, or bubbles, in a liquid comprises an emulsion. In embodiments, the product dispersion 210 may comprise a dispersion of a previously immiscible or insoluble gas, liquid or solid into the continuous phase. The product dispersion 210 has an average gas particle, globule or bubble, size less than about 1.5 µm; preferably, the globules are sub-micron in diameter. In certain instances, the average globule size is in the range from about 1.0 µm to about 0.1 µm. Alternatively, the average globule size is less than about 400 nm (0.4 µm) and most preferably less than about 100 nm (0.1 µm).

Tip speed is the velocity (n/sec) associated with the end of one or more revolving elements that is transmitting energy to the reactants. Tip speed, for a rotating element, is the circumferential distance traveled by the tip of the rotor per unit of time, and is generally defined by the equation V (m/sec) $=\pi \cdot D \cdot n$, where V is the tip speed, D is the diameter of the rotor, in meters, and n is the rotational speed of the rotor, in revolutions per second. Tip speed is thus a function of the rotor diameter and the rotation rate. In certain embodiments, altering the diameter or the rotational rate may increase the shear rate in high shear device 200.

For colloid mills, typical tip speeds are in excess of 23 n/sec (4500 ft/min) and may exceed 40 m/sec (7900 ft/min). For the purpose of the present disclosure the term 'high shear' refers to mechanical rotor-stator devices, such as mills or mixers, that are capable of tip speeds in excess of 5 m/sec (1000 ft/min) and require an external mechanically driven power device to drive energy into the stream of products to be reacted. A high shear device combines high tip speeds with a very small shear gap to produce significant friction on the material being processed. Accordingly, a local pressure in the range of about 1000 MPa (about 145,000 psi) to about 1050 MPa (152,300 psi) and elevated temperatures at the tip are produced during operation. In certain embodiments, the local pressure is at least about 1034 MPa (about 150,000 psi). The local pressure further depends on the tip speed, fluid viscosity, and the rotor-stator gap during operation.

An approximation of energy input into the fluid (kW/l/min) may be made by measuring the motor energy (kW) and fluid output (l/min). In embodiments, the energy expenditure of a high shear device is greater than 1000 W/m$^3$. In embodiments, the energy expenditure is in the range of from about 3000 W/m$^3$ to about 7500 W/m$^3$. The high shear device 200 combines high tip speeds with a very small shear gap to produce significant shear on the material. The amount of shear is typically dependent on the viscosity of the fluid. The shear rate generated in a high shear device 200 may be greater than 20,000 s$^{-1}$. In embodiments, the shear rate generated is in the range of from 20,000 s$^{-1}$ to 100,000 s$^{-1}$.

The high shear device 200 produces an emulsion capable of remaining dispersed at atmospheric pressure for at least about 15 minutes. For the purpose of this disclosure, an emulsion of gas particles, globules or bubbles, in the dispersed phase in product dispersion 210 that are less than 1.5 µm in diameter may comprise a micro-foam. Not to be limited by a specific theory, it is known in emulsion chemistry that sub-micron particles, globules, or bubbles, dispersed in a liquid undergo movement primarily through Brownian motion effects. The globules in the emulsion of product dispersion 210 created by the high shear device 200 may have greater mobility through boundary layers of solid catalyst particles, thereby facilitating and accelerating the catalytic reaction through enhanced transport of reactants.

The rotor is set to rotate at a speed commensurate with the diameter of the rotor and the desired tip speed as described hereinabove. Transport resistance is reduced by incorporation of high shear device 200 such that the velocity of the reaction is increased by at least about 5%. Alternatively, the high shear device 200 comprises a high shear colloid mill that serves as an accelerated rate reactor. The accelerated rate reactor comprises a single stage, dispersing chamber. The accelerated rate reactor comprises a multiple stage inline disperser comprising at least 2 stages.

Selection of the high shear device 200 is dependent on throughput requirements and desired particle or bubble size in the outlet dispersion 210. In certain instances, high shear device 200 comprises a Dispax Reactor® of IKA® Works, Inc. Wilmington, N.C. and APV North America, Inc. Wilmington, Mass. Model DR 2000/4, for example, comprises a belt drive, 4M generator, PTFE sealing ring, inlet flange 1" sanitary clamp, outlet flange ¾" sanitary clamp, 2HP power, output speed of 7900 rpm, flow capacity (water) approximately 300 l/h to approximately 700 l/h (depending on generator), a tip speed of from 9.4 m/s to about 41 m/s (about 1850 ft/min to about 8070 ft/min). Several alternative models are available having various inlet/outlet connections, horsepower, tip speeds, output rpm, and flow rate.

Without wishing to be limited to a particular theory, it is believed that the level or degree of high shear mixing is sufficient to increase rates of mass transfer and may produce localized non-ideal conditions that enable reactions to occur that would not otherwise be expected to occur based on Gibbs free energy predictions. Localized non-ideal conditions are believed to occur within the high shear device resulting in increased temperatures and pressures with the most significant increase believed to be in localized pressures. The increase in pressures and temperatures within the high shear device are instantaneous and localized and quickly revert to bulk or average system conditions once exiting the high shear device. In some cases, the high shear-mixing device induces cavitation of sufficient intensity to dissociate one or more of the reactants into free radicals, which may intensify a chemical reaction or allow a reaction to take place at less stringent conditions than might otherwise be required. Cavitation may also increase rates of transport processes by producing local turbulence and liquid microcirculation (acoustic streaming). An overview of the application of cavitation phenomenon in chemical/physical processing applications is provided by Gogate et al., "Cavitation: A technology on the horizon," *Current Science* 91 (No. 1): 35-46 (2006). The high shear-mixing device of certain embodiments of the present system and methods is operated under what are believed to be cavitation conditions effective to dissociate the starch into free radicals; exposed to the hydrolytic agent for the formation of the dextrose products.

Description of High Shear Process and System for Conversion of Starch

High Shear System 100, hereinafter HSS 100, is suitable for the conversion of starch to low molecular weight sugars including dextrose and maltose. Although useful for the conversion of starch to other sugars, the following discussion will be made with respect to the conversion of starch to dextrose. In embodiments, HSS 100 is used in an enzyme-enzyme process. Typical enzyme-enzyme conversion processes comprise formation of starch slurry and contact of this slurry with a starch-liquefying enzyme, for instance, bacterial alpha-amylase. The starch slurry is heated to a temperature in the range of 80° C. to 90° C. to hydrolyze the starch partially. The partially hydrolyzed starch, which generally has a DE in the range of from about 10 to about 20, is then treated with glucoamylase.

Figure 2:
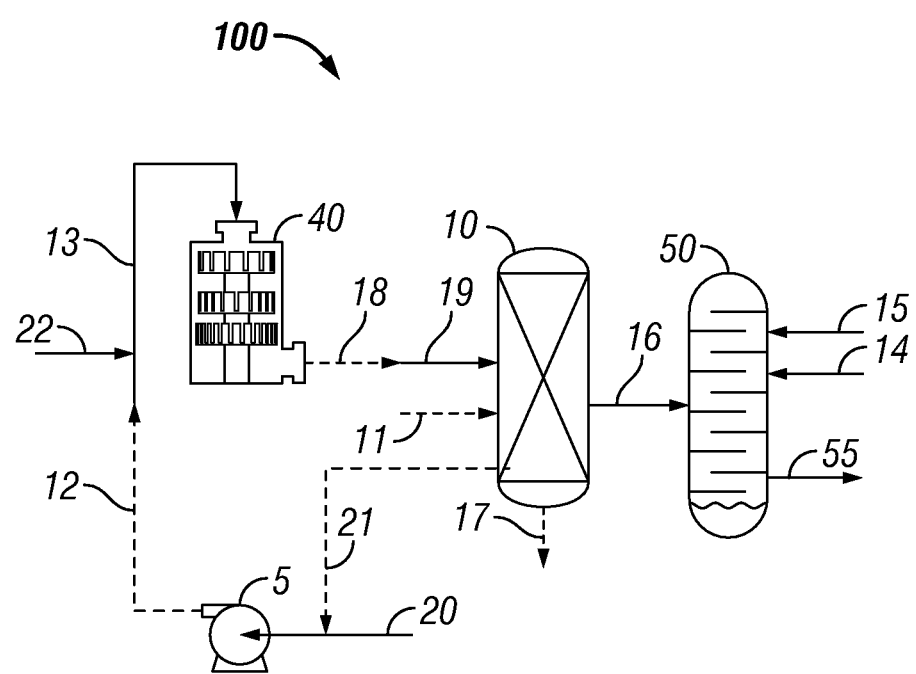
FIG. 2 is a process flow diagram according to an embodiment of the present disclosure for high shear production of starch hydrolysate.

FIG. 2 is a flow diagram of a starch conversion process comprising a high shear device. As will be further discussed below, the disclosed process with high shear device enhances the conversion by improving contact of reaction species. FIG. 2 illustrates the basic components of a representative high shear reaction system 100 including pump 5, high shear device 40, and reactor 10. In certain embodiments, the HSD 40 is positioned between pump 5 and reactor 10.

Pump inlet stream 20 is in fluid communication with pump 5. In embodiments, pump inlet stream 20 comprises an aqueous starch solution. Pump inlet stream may comprise a partially hydrolyzed starch solution. In further embodiments, the starch solution may be treated with acid or enzymes prior to pump inlet stream 20. In such embodiments, the aqueous starch solution is liquefied and partially hydrolyzed by contact with a liquefying enzyme. In certain instances, pump inlet stream 20 comprises a concentration of about 20% to about 40% starch, and preferably a starch concentration from about 35% to about 40% starch.

Pump 5 is configured to provide a controlled flow throughout high shear system 100. Pump inlet stream 20 comprising aqueous starch solution enters pump 5. Pump 5 builds pressure of the pump inlet stream 20 and feeds HSD 40 via pump outlet stream 12. Preferably, all contact parts of pump 5 are stainless steel, for example, type 316 stainless steel. In embodiments, pump 5 increases the pressure of pump inlet stream 20 to greater than about 203 kPa (2 atm). Alternatively, the pump 5 increases pressure to greater than about 2025 kPa (20 atm). The increased pressure can be used to accelerate reactions. The limiting factor for pressure in HSS 100 is the pressure limitations of pump 5 and high shear device 40. Pump 5 may be any suitable pump, for example, a Roper Type 1 gear pump, Roper Pump Company (Commerce Georgia) or a Dayton Pressure Booster Pump Model 2P372E, Dayton Electric Co (Niles, Ill.).

Pump 5 is in fluid communication with HSD 40 via pressurized outlet stream 12. Pressurized outlet stream 12 is in injected into HSD inlet stream 13. In certain embodiments, pressurized outlet stream 12 and HSD inlet stream 13 are homologous. Alternatively, HSD inlet stream 13 comprises pressurized outlet stream 12 that has undergone additional processing. In certain embodiments, pressurized outlet stream is cooled or heated prior to injection into HSD inlet stream 13.

Dispersible reactant stream 22 is injected into HSD inlet stream 13. Dispersible reactant stream 22 may be injected in to HSD inlet stream 13 for introduction to HSD 40. Alternatively, dispersible reactant stream 22 is injected directly in to HSD 40. HSD inlet 13 may comprise a poorly mixed solution comprising pressurized outlet steam 12 and dispersible reactant stream 22. Dispersible reactant stream 22 may be injected simultaneously with pressurized outlet stream 12 into HSD inlet stream 13. In certain embodiments, pressurized outlet stream 12 and dispersible reactant stream 22 are mixed prior to introduction to HSD inlet stream 13.

Dispersible reactant stream 22 comprises a hydrolytic agent in solution. In embodiments, the hydrolytic solution comprises at least one acid and/or at least one hydrolytic enzyme. Alternatively, dispersible reactant stream 22 comprises an acid/enzyme mixture. In embodiments, dispersible reactant stream 22 comprises an acid selected from hydrochloric acid, sulfuric acid, oleum (or fuming sulfuric acid), and mixtures thereof. In some embodiments, acid stream 22 comprises hydrochloric acid. Further, the acid comprises a pH of between about pH 1 and about pH 4. Dispersible reactant stream 22 may be heated to a temperature between about 70° C. and about 160° C. Further, dispersible reactant stream 22 comprises a glucoamylase. In embodiments, dispersible reactant stream 22 comprises a thermostable endo-amylase. In embodiments, thermostable endo-amylase is produced from *Bacillus lichenformis*. The hydrolyzing enzyme may comprise a bacterial alpha-amylase enzyme. Alpha-amylase enzyme may be produced from many types of microorganisms, for example by certain *Aspergillus* species and/or *Bacillus subtilis*. Alpha-amylase is an enzyme capable of randomly splitting the starch molecule into smaller chain units and may be used in the enzyme-enzyme process as liquefying enzyme. Alpha-amylase does not selectively split off dextrose units and breaks only the α-1,4-glucosidic bond. Alpha-amylase is an endo-amylolytic enzyme capable of promoting almost random cleavage of α-1,4-glucosidic bonds within the starch molecule. Alpha-amylase is elaborated by many types of microorganisms such as members of the *Bacillus subtilis* species, *Aspergillus niger* and other species of the *Aspergillus* genus and malted cereal grains. Alpha-amylase will not act upon the α-1,6-glucosidic bonds in the starch molecule to any significant degree. Glucoamylase will act upon such bonds, but at a rate that is slower than is desired in commercial applications.

HSD 40 is in fluid communication with HSD inlet stream 13, comprising dispersible reactant stream 22, and pressurized outlet stream 12. HSD 40 intimately mixes aqueous starch solution in pump outlet stream 12 with dispersible reactant stream 22 comprising acid and/or enzymes. HSD 40 creates an emulsion of dispersible reactant stream 22 within high shear inlet stream 13. As discussed in detail above, the high shear device 40 is a mechanical device that utilizes, for example, a stator rotor mixing head with a fixed gap between the stator and rotor. HSD 40 combines high tip speeds with a very small shear gap to produce significant shear on the material being processed. The amount of shear will be dependant on the viscosity of the fluid. In high shear device 40, the aqueous starch solution and acid-enzyme solutions are mixed to form an emulsion comprising micro-globules and nano-globules of the acid/enzyme solution dispersed in the aqueous starch solution. In certain instances, multiple high shear devices 40 are in fluid communication with HSD inlet stream 13. Further, use of multiple high shear mixers aligned in series, perhaps with varying shear rates, is contemplated to enhance the reaction.

HSD 40 may form an emulsion of immiscible liquid reactants. Alternatively, HSD 40 increases the dispersion and mixing of miscible liquid reactants in an emulsion. In certain instances HSD 40 a forms a highly mixed liquid-liquid phase (e.g., a fine emulsion) which may also include the low DE hydrolysate product. In embodiments, the resultant emulsion comprises globules in the submicron size. In embodiments, the resultant dispersion has an average globule size less than about 1.5 μm. In embodiments, the mean globule size is less than from about 0.1 μm to about 1.5 μm, preferably the mean globule size is less than about 400 nm; more preferably, less than about 100 nm. In embodiments, the high shear mixing produces globules capable of remaining dispersed at atmospheric pressure for about 15 minutes or longer depending on the globule size.

Without wishing to be limited to a particular theory to explain the mechanical effects of high shear mixing in the high shear process, it is thought that when such emulsion is formed, the surface area available for the reaction between the two phases is significantly increased, leading to an increased rate of reaction. In embodiments, transport resistance is reduced by incorporation of external high shear device 40 such that the velocity of the reaction is increased by a factor of from about 10 to about 100 times. The hydrolysis reaction may initiate once the emulsion has been formed. In this sense, hydrolysis could occur at any point in HSS 100 of FIG. 2 if conditions are suitable. Not to be limited by a specific method, it is known in emulsion chemistry that submicron particles, bubbles, or globules dispersed in a liquid undergo movement primarily through Brownian motion effects.

HSD 40 is in fluid communication with reactor 10. Reactor 10 is any type of reactor in which the liquefaction and/or hydrolysis of starch can continue. High shear device (HSD) outlet stream 18 comprises an emulsion of micron and/or submicron-sized globules, as discussed hereinabove. HSD outlet stream 18 is fluidly connected to reactor inlet stream 19. HSD outlet stream and reactor inlet stream 19 may be the same stream. In certain instances, the HSD outlet stream 18 may be further processed before entering reactor inlet stream 19. Alternatively, HSD outlet stream 18 may be recycled through the HSD 40 prior to introduction to reactor inlet stream 19. As discussed hereinabove, the liquefaction and/or hydrolysis of starch may begin in HSD 40, or HSD outlet stream 18 prior to introduction to reactor 10.

In certain embodiments, HSD outlet stream 18 may be heated or cooled prior to introduction to reactor 10. In embodiments, the temperature for conversion of starch to low DE hydrolysate is less than about 160° C. The emulsion in HSD outlet stream 18 is maintained at a temperature of from about 70° C. to about 160° C. and more preferably, from about 85° C. to about 105° C. In certain instances, the use of external heat exchangers for heating and/or cooling is within the scope of one or more of the embodiments described and claimed herein. There are many suitable heat transfer devices known to those of skill in the art that may be used successfully without departing from the spirit of the described embodiments. Such exchangers may preferably include, without limitation, shell-and-tube, plate, and coil heat exchangers, as will be known to those of skill in the art. After processing by heat exchangers, HSD outlet stream 18 is injected into reactor inlet stream 19 for introduction to reactor 10.

Reactor inlet stream 19 is in fluid communication with reactor 10. Reactor 10 may be any reactor configured for the liquefaction and/or hydrolysis of starch. Reactor 10 may preferably be a continuous stirred tank reactor or a batch reactor, without limitation. Further, reactor 10 may comprise a jacketed reactor. In certain embodiments, reactor 10 is configured as a holding tank for increased residence time, and/or agitation of reaction mixture. In embodiments, reactor 10 may primarily serve to cool/hold reaction fluid, as much of the reaction occurs in external high shear device 40 and throughout HSS 100. Reaction heat may be removed from reactor 10 via any method known to one skilled in the art. The use of external heating and/or cooling heat transfer devices is also contemplated. Suitable locations for external heat transfer devices would be between the reactor 10 and the pump 5, between the pump 5 and the high shear device 40, or between the high shear device 40 and the reactor 10. Any suitable heat exchanger known to those experienced in the art may be used.

Reactor 10 is in fluid communication with a plurality of fluid conduits. Conduits may include supplemental reactant inlet 11, product stream 16, liquid stream 17, and recycle stream 21. Supplemental reactant inlet 11 is configured for the introduction of further reactants to the reactor. In certain instances, additional acid or enzymes may be added to the reactor. Liquid stream 17 comprising, for example, water is removed from the reactor 10. Liquid stream 17 may comprise excess acid, or additional liquid wastes for disposal. Recycle stream 21 is configured for recycling portions of the reaction mixture through the HSS 100. Recycle stream 21 may fluidly couple the pump inlet stream 20 and the reactor 5. Further, recycle stream 21 may be in fluid communication with any portion of HSS 100, in order to re-circulate or recycle, without limitation, a portion of the reaction mixture. As understood by one skilled in the art, the recirculation of a portion of the reaction mixture improves the product hydrolysate.

Product stream 16 drains reactor 10. Product stream 16 comprising low DE hydrolysate may be extracted from high shear system 100 via product stream 16. Upon removal from reactor 10, product stream 16 comprising the hydrolysate may be utilized in additional processes. Additionally, product stream 16 may be passed to further processing units downstream of high shear system 100 for further processing as known to those of skill in the art. In embodiments, the liquefied and partially hydrolyzed starch comprise product stream 16. The partially hydrolyzed starch solution comprises a low dextrose-equivalent (DE) product. The product stream 16 comprises DE value of less than about 20; preferably, the DE value is less than about 15 in product stream 16. In embodiments, the liquefied and partially hydrolyzed starch product stream 16 has a dextrose equivalent (DE) value of at most about 20. Alternatively, the hydrolysate in the product stream 16 has a DE value of up to about 15. Conventional non-high shear acid-enzyme processes are disclosed, for example, in U.S. Pat. Nos. 2,305,168; 2,531,999; 2,893,921; 3,012,944 and 3,042,584. The contents of these patents are hereby incorporated herein in their entirety for all purposes.

In embodiments, product stream 16 is in fluid communication with vessel 50. Further, product stream 16 fluidly couples reactor 10 to vessel 50. Vessel 50 is configured for further hydrolysis. Vessel 50 comprises enzyme inlet 14, de-branching enzyme inlet 15, and syrup product stream 55. For example, low DE syrups in product stream 16 are subjected to further hydrolysis in vessel 50. In certain embodiments, vessel 50 is configured for additional enzyme mediated hydrolysis. Additional enzymes may be added to the reaction mixture comprising product stream 16 via enzyme inlet 14. Vessel 50 is preferably maintained at a pH between about pH 3.0 and about pH 6.0. In FIG. 2, complete hydrolysis of low DE hydrolysate product stream 16 to low MW sugars is performed in vessel 50. In certain embodiments, low MW sugars comprise high dextrose syrups withdrawn from HSS 100 by syrup product stream 55.

Syrup product stream 55 may be produced by a number of hydrolysis reactions. In certain embodiments, HSS 100 produces high dextrose syrups by saccharification of liquefied starches with glucoamylase, GA. Glucoamylases are dextrogenic exoamylases produced by various fungi (e.g., *Aspergillus, Rhizopus*). Most of the commercially available GA preparations are produced by *Aspergillus* sp. and are optimally active over the pH range from about pH 4.0 to about pH 5.0. Further, the GA preparations are operationally stable at temperatures of about 60° C. In embodiments, high dextrose syrups containing about 90% dextrose may be obtained by saccharifying product stream 16 with GA within a preferred pH range of about pH 4.3 to about pH 4.5. In certain embodiments, the internal conditions of vessel 50 are maintained for extended periods, for example, about 3 to about 4 days.

The low DE liquefied starch hydrolysates in product stream 16 may be treated with soluble glucoamylase enzyme preparations to convert the low dextrose equivalent starch hydrolysate in product stream 16 to dextrose or dextrose containing syrups. In embodiments, product stream 16 is treated with enzyme for the conversion of low DE hydrolysate to produce syrups comprising low molecular weight sweet sugars using enzymes that are specific with regard to the products they form. In embodiments, the pH of vessel 50 is about pH 4.3 where glucoamylase is optimally active is the typical pH employed by industry.

In certain instances, the operation of dextrose producing system, such as HSS 100, has several additional requirements regarding saccharifying enzymes. The enzymes must be capable of functioning at a high solids level. The enzymes must also be operationally stable at relatively high temperatures, i.e., they must be thermostable. The thermostability requirement is imposed for two reasons: (1) the risk of microbial contamination is reduced, and (2) the rate of saccharification is increased, which in turn enables increases the production capacity of a HSS 100 using existing equipment. Generally, HSS 100 requires that the saccharifying enzymes be thermostable at temperatures above about 50° C. For example, glucoamylase derived from *Aspergillus* may be selected over those produced by other genera, such as *Rhizopus*, because the former are more thermostable.

Amylopectin is the principal component of certain starches. It is a mixed linkage glucose homopolymer in which the glucosyl moieties are linked by α-1,4 and α-1,6 glycosidic bonds. In embodiments, product stream 16 is treated with enzyme inlet 14 in vessel 50. Enzyme inlet 14 comprises α-1,4 carbohydrase, in vessel 50, to produce a high DE sugar syrup in syrup product stream 55. The α-1,4-carbohydrase which is most commonly used when a high dextrose syrup is desired, is a glucoamylase, such as that derived from *Aspergillus niger*, which will cleave α-1,4 linkages. In embodiments, glucoamylase is introduced to vessel 50 by enzyme inlet 14.

Glucoamylase has been referred to in the art as glucamylase glucogenic enzyme, starch glucogenase, and gama-amylase. Glucoamylase is an exo-amylolytic enzyme that catalyzes the sequential hydrolysis of glucose moieties from the non-reducing ends of starch or amylodextrin molecules. Glucoamylase preparations are produced from certain fungi strains such as those of genus *Aspergillus*, for example, *Aspergillus phoenicis, Aspergillus niger, Aspergillus awamori*, and certain strains from the *Rhizopus* species and certain *Endomyces* species. Glucoamylase effects the hydrolysis of starch proceeding from the non-reducing end of the starch molecule to split off single glucose units at the α-1,4 or at the α-1,6 branch points. Commercially available glucoamylase enzyme preparations may comprise several enzymes in addition to the glucoamylase. For example, traces of proteinases, cellulases, alpha-amylases, and transglucosidases may be included. While glucoamylase is capable of hydrolyzing both, its activity for α-1,6 bond branch points is considerably less than for α-1,4 bonds. Glucoamylases are capable of cleaving both the α-1,4 and α-1,6 glycosidic bonds which occur in starch and in theory should be able to effect complete conversion. In practice, high yields are obtained when the starch is saccharified at a low solids level of less than about 10% (w/w). However, when the saccharifications are conducted at solids levels in the range of about 30% (w/w) to about 40% (w/w), the dextrose content of the resultant syrup is substantially reduced due to the accumulation of higher degree of polymerization saccharide impurities. However, syrups of lower dextrose content are acceptable due to the economic advantages gained by conducting the saccharification at a higher starch solids level.

In embodiments, a starch debranching enzyme selected from glucoamylases, isoamylases, and pullulanases is added to vessel 50 via debranching enzyme inlet 15. The diminished reaction rate of certain amylases discussed hereinabove acting on the branch points impedes complete saccharification to dextrose using GA alone. The situation would be expected to improve if the branch points were more efficiently hydrolyzed. Debranching enzymes or α-1,6-glucosidases have recently been used for their ability to break the α-1,6 linkages which are not hydrolyzed or broken by the action of α-amylase. See, for example, U.S. Pat. No. 4,734,364, which is hereby incorporated herein by reference, for all purposes. Although both of the enzymes possess some α-1,6 debranching activity, the debranching enzyme is more potent than glucoamylase and as a result the reaction time may be significantly reduced by HSS 100.

The α-1,4 carbohydrase, which is most commonly used in the industry when a high dextrose syrup is desired, is a glucoamylase, such as that derived from *Aspergillus niger*, which will cleave α-1,4 linkages. In embodiments, debranching enzyme is added to at least 0.001 debranching enzyme per gram dry substrate (units/gds) are used and preferably from about 0.10 units/gds to about 0.5 units/gds pullulanase. The amount of glucoamylase is at least about 0.01 units/gds, and preferably about 0.15 units/gds to about 0.3 units/gds of glucoamylase activity. In these embodiments, the vessel 50 is kept at a pH ranging from about pH 4.0 to about pH 5.3 and a temperature of about 55° C. to about 65° C.

The α-1,4 carbohydrase which is used when the desired syrup product stream 55 comprises a high maltose syrup is a maltogenic or maltose producing enzyme, such as sweet potato β-amylase. The amount of enzyme to be added is preferably the minimum amount required to convert the α-1,4 polysaccharides to maltose. Normally amounts of at least about 1 units to about 4 units debranching enzyme per gram dry substrate (units/gds) are used. Larger amounts can be used but are less economical. In these embodiments, vessel 50 is operated at a pH of about pH 4.5 to about pH 5.5 and a temperature of about 55° C. to about 60° C.

Amylo-1,6-glucosidase derived from *Aerobacter aerogenes* is added via debranching enzyme inlet 15 to vessel 50 to effect conversion of low DE hydrolysate to dextrose. U.S. Pat. No. 3,897,305 describes a method for converting starch to dextrose by saccharifying a low DE starch stream with an enzyme system comprising glucoamylase and amylo-1,6-glucosidase. Implementing this enzyme system with HSS 100, starch may be hydrolyzed to a greater degree in vessel 50. The dextrose yield in syrup product stream 55 and rate of production are increased. In embodiments, the amount of the debranching enzyme in reactor 50 is at least 0.001 units and preferably will be from about 0.10 units/gds to about 0.5 units/gds. The amount of glucoamylase is at least about 0.01 units/gds and preferably about 0.15 units/gds to about 0.3 units/gds of glucoamylase activity.

When the desired product is a high maltose syrup, the α-1,4 carbohydrase used comprises a maltogenic or maltose producing enzyme, such as sweet potato β-amylase. The amount of enzyme to be added is preferably the minimum amount required to convert the α-1,4 polysaccharides to maltose. Normally amounts of at least about 1 units/gds to about 4 units/gds are used. It is feasible, though less economical, the use high quantities of enzyme. In certain embodiments, saccharification in vessel 50 is conducted at a pH of from about 4.5 to about 5.5 and a temperature of from about 55° C. to about 60° C.

In embodiments, vessel 50 may comprise α-amylase and immobilized GA. The hydrolysis reaction in vessel 50 may be carried out according to U.S. Pat. No. 4,102,745 that describes a process for converting starch to dextrose wherein a partially hydrolyzed starch solution, containing at least 10 percent hydrolyzed starch, is contacted with an enzyme system. The starch solution is contacted with the enzyme solution under conditions whereby substantially complete conversion of the starch to dextrose is achieved. The enzyme system comprises immobilized glucoamylase and alpha-amylase selected from the group consisting of soluble alpha-amylase, immobilized alpha-amylase and mixtures thereof. Various procedures have been described for the immobilization of glucoamylase, alpha-amylase, and amylolytic enzyme combinations. In the art methods of glucoamylase immobilization are presented, for example, in U.S. Pat. Nos. 3,783,101; 2,717,852; 3,519,538; 3,619,371; 3,627,638; 3,672,955; 3,715,277; 2,783,101; and 3,950,222. Combining these methods with HSS 100 feasibly increase the production of dextrose and starch hydrolysates. In embodiments, low DE syrup stream 16 is converted as, for example, described in U.S. Pat. No. 4,132,595 to high DE hydrolysate using soluble glucoamylase and subsequently treated solely with an immobilized glucoamylase enzyme to in vessel 50 to produce a dextrose product stream 55

In embodiments, use of the disclosed process comprising reactant mixing via external high shear device 40 provides a higher conversion of starch to dextrose and/or decreased volumes of lysing agent due to more efficient mixing. The method comprises incorporating high shear device 40 into an established process thereby enabling the increase in production, by greater throughput, compared to a process operated without high shear device 40. Additional potential benefits of this modified system include, but are not limited to, faster cycle times, reduced operating costs and/or reduced capital expense due to the possibility of designing smaller reactors and/or operating the reactor at lower residence times. In embodiments, the process of the present disclosure provides for a residence time less than about ¾ the residence time for conversion of starch to low DE hydrolysate in the absence of external high shear mixing. In embodiments, the process of the present disclosure provides for a residence time of less than about ½ the residence time (for the same conversion) when compared to conversion of starch to low DE hydrolysate in the absence of external high shear mixing.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims that follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent they provide exemplary, procedural, or other details supplementary to those set forth herein.

We claim:

1. A method for producing starch hydrolysate, the method comprising:
    forming a dispersion comprising a hydrolytic solution comprising glucoamylase and an aqueous starch solution utilizing a high shear device, wherein the high shear device comprises at least one rotor and at least one stator separated by a shear gap width in the range of from 0.025 mm to 10.0 mm and wherein the high shear device produces a localized pressure of at least 1000 MPa at the tip of the at least one rotor; and
    introducing the dispersion into a reactor from which a product comprising dextrose is removed, wherein the operating temperature within the reactor is maintained at a temperature of less than 160° C.

2. The method of claim 1 further comprising pumping a completely liquid phase reactant stream comprising aqueous starch solution to a pressure of at least 203 kPa to produce a pressurized stream.

3. The method of claim 1, wherein the dispersion comprises hydrolytic solution bubbles with an average bubble diameter of less than 5 μm.

4. The method of claim 1, wherein the at least one rotor comprises a toothed rotor surface and the at least one stator comprises a toothed stator surface, and wherein forming the dispersion comprises rotating the at least one rotor at a tip speed of at least 5 m/s.

5. The method of claim 1, wherein the high shear device comprises a second rotor/stator combination separated by a second shear gap, and wherein forming the dispersion comprises rotating the at least one rotor at a tip speed of at least 20 m/s.

6. The method of claim 5, wherein forming the dispersion comprises subjecting the hydrolytic solution and aqueous starch solution to a shear rate of greater than 20,000 $s^{-1}$ between the at least one rotor and the at least one stator, and wherein the shear rate in the second rotor/stator combination is greater than the shear rate between the at least one rotor and the at least one stator.

7. The method of claim 1 wherein forming the dispersion comprises an energy expenditure of at least 1000 W/m$^3$.

8. The method of claim 1, wherein prior to forming the dispersion the hydrolytic solution and the aqueous starch solution are mixed together and heated to a temperature in the range of about 80° C. to about 90° C.

9. The method of claim 8, wherein the hyrdolic solution comprises an acid selected from the group consisting of hydrochloric acid, sulfuric acid, oleum, and combinations thereof.

10. The method of claim 1, wherein the glucoamylase is produced from a fungi strain consisting of aspergillus, rhizopus, or endomyces.

11. The method of claim 10, the method further comprising the reactor operating with a pH in the range of about 4 to about 5.

12. A method for producing starch hydrolysate, the method comprising:
   forming a liquid-liquid phase dispersion comprising hydrolytic solution comprising glucoamylase and aqueous starch by introducing the hydrolytic solution and aqueous starch into a high shear device operating with a shear rate of at least 20,000 $s^{-1}$;
   wherein said high shear device comprises at least one rotor and at least one stator with a gap width in the range of from 0.025 mm to 10.0 mm.

13. The method of claim 12, wherein prior to introducing the hydrolytic solution and the aqueous starch into the high shear device, the hydrolytic solution and the aqueous starch are mixed together and heated to a temperature in the range of about 80° C. to about 90° C.

14. A system for the production of starch hydrolysate, the system comprising:
   a high shear device comprising at least one rotor and at least one stator having a minimum clearance therebetween and configured to produce a dispersion of hydrolytic solution globules in a solution comprising aqueous starch, the dispersion having an average globule diameter of less than 100 nm, wherein said minimum clearance is in the range of from 0.025 mm to 10.0 mm and wherein said high shear device is configured to produce a localized pressure of at least 1000 MPa at the tip of the at least one rotor;
   a reactor fluidly connected to an outlet of the high shear device and configured to produce a product stream having a DE value of less than about 20, wherein the reactor is operated at a temperature of less than 160° C.; and
   a vessel configured to receive the product stream from the reactor, wherein at least a portion of the product stream is reacted with glucoamylase in the vessel.

15. The system of claim 13 wherein the high shear device comprises at least two rotors and at least two stators.

16. The system of claim 13 wherein the high shear device is adapted to rotate the at least one rotor at a tip speed of at least 5 m/sec.

17. The system of claim 13 wherein the high shear device can produce a shear rate of greater than 20,000 $s^{-1}$.

18. The system of claim 13 wherein hydrolytic solution comprises a solution selected from the group consisting of acids, hydrolytic enzymes, and combinations thereof.

19. The system of claim 17 wherein the acid is selected from the group consisting of hydrochloric acid, sulfuric acid, oleum (fuming sulfuric acid), and combinations thereof.

20. The system of claim 17 wherein the at least one hydrolytic enzyme solution is selected from the group consisting of alpha-amylases, beta-amylases, glucoamylases, isoamylases, glucosidases, carbohydrases, pullulanases, cellulases, and combinations thereof.

* * * * *